United States Patent [19]
Wakisaka et al.

[11] Patent Number: 5,462,138
[45] Date of Patent: Oct. 31, 1995

[54] BRAKE BAND

[75] Inventors: Toshiaki Wakisaka; Hirofumi Nakagomi, both of Shizuoka, Japan

[73] Assignee: NSK-Warner K.K., Tokyo, Japan

[21] Appl. No.: 252,330

[22] Filed: May 26, 1994

[30] Foreign Application Priority Data

May 31, 1993 [JP] Japan .................................... 5-149784

[51] Int. Cl.$^6$ .................................................. F16D 51/00
[52] U.S. Cl. ..................................... 188/77 R; 188/250 G
[58] Field of Search ............................. 188/77 R, 77 W, 188/250 G

[56] References Cited

U.S. PATENT DOCUMENTS 1,857,125   5/1932   Brackett .............................. 188/250 G

FOREIGN PATENT DOCUMENTS 4053586   2/1992   Japan .................................... 188/77 W
5071564   3/1993   Japan .................................... 188/250 G Primary Examiner—Robert J. Oberleitner
Assistant Examiner—Kevin D. Rutherford
Attorney, Agent, or Firm—Evenson, McKeown, Edwards & Lenahan

[57] ABSTRACT

A brake band suitable for use in an automatic transmission is described. The brake band has a brake lining with a surface subjected beforehand to working on an apply side thereof and having a percent contact area in a range of 10–40%, preferably 25–40% on the apply side thereof at the time of commencement of use.

16 Claims, 2 Drawing Sheets

BRAKE BAND

BACKGROUND OF THE INVENTION a) Field of the Invention

This invention relates to a brake band suitable for use in an automatic transmission for an automotive vehicle or the like, and particularly to a brake band allowing the automatic transmission to exhibit stable speed changing performance over a prolonged period of time.

b) Description of the Related Art

To facilitate understanding of the present invention, the basic construction of a brake band will be described with reference to FIG. 4. A brake band 10 is formed of a strap 3 made of a thin steel plate or the like and a lining 2 bonded on an inner side of the strap 3. In use, the brake band 10 is arranged surrounding a drum 1.

Numeral 4 designates a bracket on a side where braking pressure (hydraulic pressure $P_1$ in FIG. 4) is applied (hereinafter called "the apply side"), whereas numeral 4' indicates a bracket on a fixed side (hereinafter called "the anchor side"). Designated at numeral 5 is a hydraulic device.

When the drum 1 is rotating from the anchor side toward the apply side (i.e., in a direction indicated by arrow $R_1$), the direction of rotation of the drum is called "the energizing direction". An opposite case (the rotating direction indicated by arrow $R_2$), on the other hand, is called "the deenergizing direction".

Before use, a lining of a brake band has a small percent contact area and also a small coefficient of friction. In the course of use, however, the lining gradually wears out on the apply side, resulting in the problem that the percent contact area and the coefficient of friction both increase and significant variations take place in speed changing performance.

FIG. 5 diagrammatically illustrates variations in the coefficient of friction, $\mu$ and percent contact area, P of a conventional brake band as a function of the number of applications (cycles), n plotted along the abscissa. In the diagram, the solid curve M shows variations in the coefficient of friction while the dashed curve S depicts variations in the percent contact area. It is indicated that both the coefficient of friction and the percent contact area increased to values approximately four times as much as their values at the time of the commencement of use of the brake band until n reached about 6,000 cycles. In the diagram, the left-hand ends of the respective curves show the corresponding values at the time of the commencement of use of the brake band while their right-hand ends indicate the corresponding values when the brake band had been applied 6,000 times.

In FIG. 2, coefficients of friction, $\mu$ are plotted along the ordinate whereas percent contact areas, P are plotted along the abscissas. FIG. 2 indicates that the friction of coefficient proportionally increases with the percent contact area.

The percent contact area and coefficient of friction of a conventional brake band both increase with the number of applications as described above, so that the speed changing performance does not remain constant.

FIG. 3 illustrates how to calculate a percent contact area. A line is drawn at a height 5 μm the way down from the top of a tallest asperity on a surface of a brake lining. Lengths $l_1, l_2, l_3, l_4$ of individual asperities cut by the line are added. The percent contact area is expressed by the percentage of the sum of the lengths based on an overall length L, namely, $(l_1 + l_2 + l_3 + l_4)/L \times 100$.

The percent contact area of a brake band can be represented generally by the following formula:

$$\sum_{k=1}^{n} l_k/L \times 100 \, (\%)$$

where

L: the overall length of the brake band; and n: the number of asperities.

SUMMARY OF THE INVENTION

An object of this invention is to overcome the above-described drawback of the conventional brake bands, and hence to provide a brake band which allows an automatic transmission to exhibit stable speed changing performance over a prolonged period of time.

In one aspect of this invention, there is thus provided a brake band suitable for use in an automatic transmission, comprising a brake lining with a surface subjected beforehand to working on an apply side thereof and having a percent contact area in a range of 10–40% on the apply side thereof at the time of commencement of use. The percent contact area can preferably be in a range of 25–40%.

The brake band according to this invention is constructed as described above, so that variations in the coefficient of friction with time can be reduced to ensure stable speed changing performance over a prolonged period of time.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION

In a brake band according to this invention, a brake lining is subjected on an apply side of the brake band to working before use so that the percent contact area of the lining falls within the range of 10–40%, preferably 25–40% at the time of commencement of its use.

Figure 1:
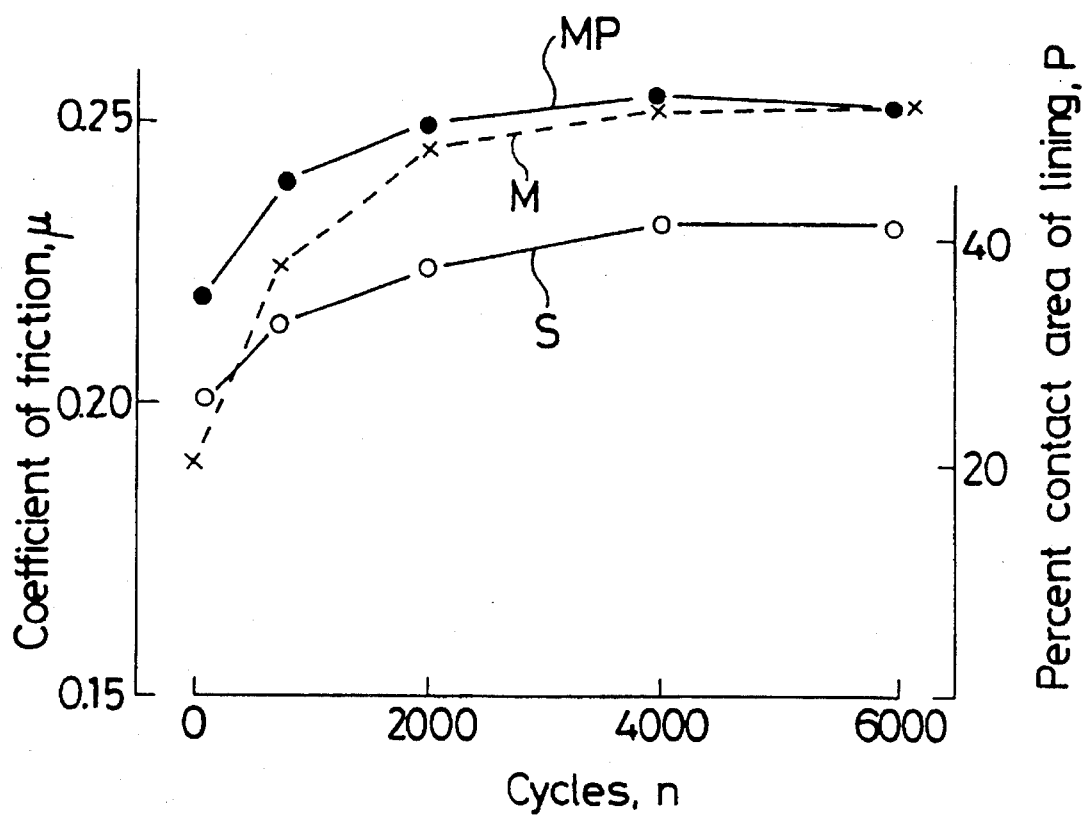
FIG. 1 diagrammatically compares variations in the coefficient of friction of a lining in a brake band according to this invention with those in the coefficient of friction of a lining in a conventional brake band, that is, a new lining not subjected to working beforehand to increase its percent contact area.
Figure 2:
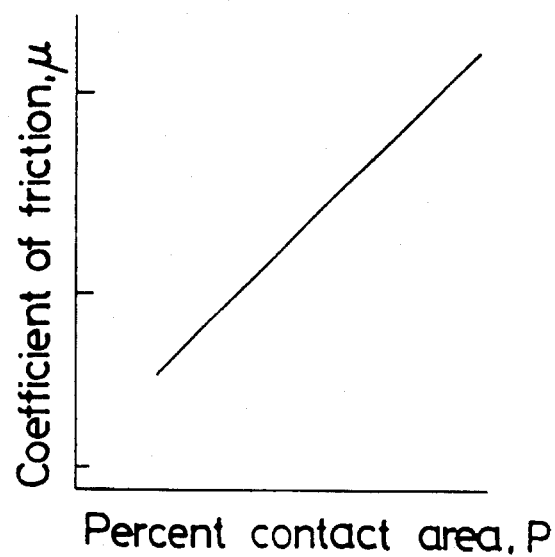
FIG. 2 diagrammatically illustrates coefficients of friction as a function of percent contact area.
Figure 3:
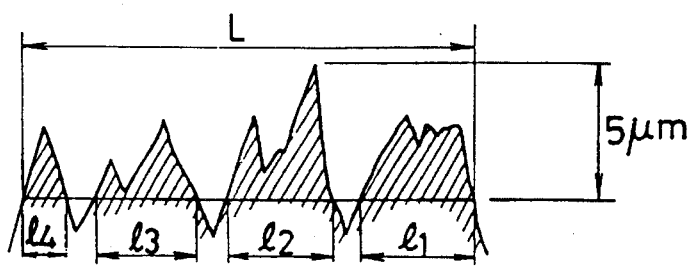
FIG. 3 illustrates how to calculate a percent contact area.

In FIG. 1, the coefficient of friction, $\mu$ and percent contact area P of the brake band according to this invention are plotted along the ordinate while the number of applications (cycles), n are plotted along the abscissa. The are compared with the corresponding values of the conventional brake band.

Figure 5:
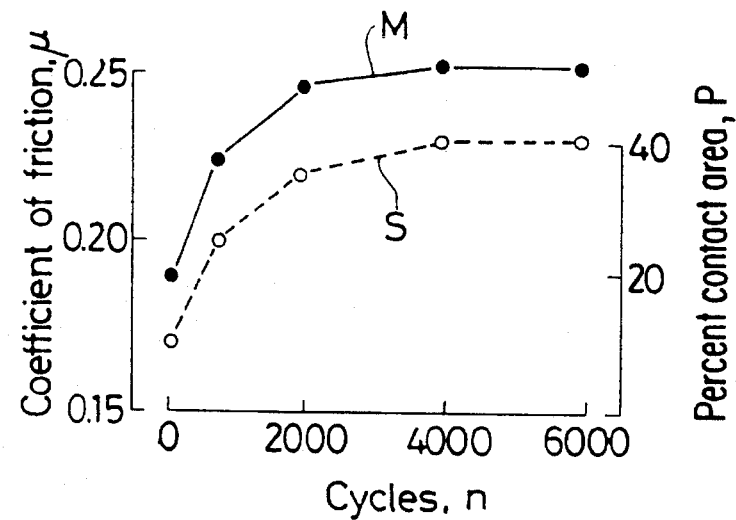
FIG. 5 diagrammatically shows variations in the coefficient of friction and percent contact area of a conventional brake band.

The dashed curve M connecting X's indicates variations in the coefficient of friction of an unworked brake band such as the conventional brake band whose coefficient of friction and percent contact area are shown in FIG. 5, the solid curve MP connecting dots (•) variations in the coefficient of friction of a brake band according to the present invention, said brake band having been subjected to working to increase its percent contact area, and the solid curve S connecting circles (○) variations in the percent contact area of the brake band according to the present invention.

In the case of the brake band not subjected to working to increase the percent contact area prior to its use, the coefficient of friction increased by about 1.5 times at n=6,000 cycles compared with the value at the time of commencement of its use. It is understood from a comparison between the curve M and the curve MP that the speed changing performance of the brake band not subjected to such working undergoes greater variations. The percent contact area of the brake band subjected to such working was about 25% at the time of commencement of its use and about 40% at n=6,000 cycles. This means that even at n=6,000 cycles, the percent contact area was as small as 1.6 times the value at the time of commencement of its use.

The brake band according to this invention, which has been subjected to working, has a greater percent contact area and hence a greater coefficient of friction from the beginning, so that variations in its percent contact area and coefficient of friction are small enough to assure stable speed changing performance.

Figure 4:
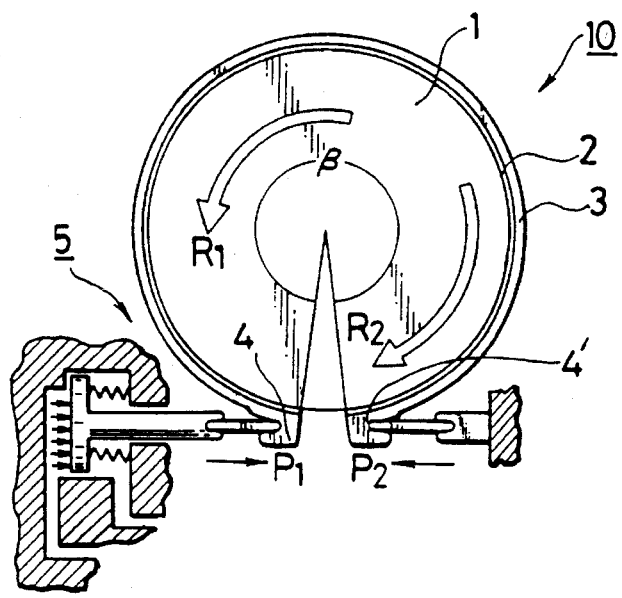
FIG. 4 is a schematic illustration of the construction of a brake band as arranged around a drum.

The above working can be effected in various ways. For example, a drum is rotated in a deenergizing direction (in other words, in the direction from the apply side to the anchor side as shown in FIG. 4) and the brake band is pressed against the drum to increase the percent contact area of the lining on the apply side. As an alternative, lapping is applied to the lining on the apply side or heat treatment is applied under pressure to the surface of the lining on the apply side, so that the percent contact area is increased.

Incidentally, the initial coefficient of friction of a brake band which has been subjected over the entire surface thereof to working to increase its percent contact area is not different from that of an apply-side portion of a brake band subjected to such working on the apply side only. When the drum is rotating in a leading direction (in other words, in the direction from the anchor side to the apply side), the surface pressure on the anchor side is about twice as much as that on the apply side. The brake band subjected over the entire surface thereof to such working is therefore accompanied by the inconvenience that its service life is short. It is therefore not desired to subject the entire surface of a lining to working to increase its percent contact area.

We claim:

1. A brake band-suitable for use in an automatic transmission, comprising a brake lining having an apply side and an anchor side, a surface of said brake lining at the apply side thereof having a percent contact area in the range of 10–40% when new produced by working, whereby said brake band has a greater contact area than an unworked brake band wherein the percent contact area is defined by a ratio of a total cross-sectional length of surface asperities to a given length of said lining.

2. A brake band according to claim 1, wherein the percent contact area of the surface of the brake lining is in the range of 25–40%.

3. A brake band according to claim 2, wherein said working is performed by pressing the band against a drum which is rotating in the direction from the apply side to the anchor side.

4. A brake band according to claim 2, wherein said working is performed by lapping the lining on the apply side.

5. A brake band according to claim 2, wherein said working is performed by heat treating the surface of the lining under pressure on the apply side.

6. A brake band according to claim 1, wherein said working is performed by pressing the band against a drum which is rotating in the direction from the apply side to the anchor side.

7. A brake band according to claim 1, wherein said working is performed by lapping the lining on the apply side.

8. A brake band according to claim 1, wherein said working is performed by heat treating the surface of the lining under pressure on the apply side.

9. A brake band according to claim 1, wherein said total cross-sectional length of surface asperities is measured at a line drawn 5 μm down from the top of a tallest asperity on said surface.

10. A method of making a brake band suitable for use in an automatic transmission comprising a brake lining having an apply side and an anchor side, comprising working a surface of said brake lining at the apply side thereof to produce a percent contact area in the range of 10–40% when new, whereby said brake band has a greater contact area than an unworked brake band wherein the percent contact area is defined by a ratio of a total cross-sectional length of surface asperities to a given length of said lining.

11. A method of making a brake band according to claim 10, wherein said working is performed by pressing the band against a drum which is rotating in the direction from the apply side to the anchor side.

12. A method of making a brake band according to claim 10, wherein said working is performed by lapping the lining on the apply side.

13. A method of making a brake band according to claim 10, wherein said working is performed by heat treating the surface of the lining under pressure on the apply side.

14. A method of making a brake band according to claim 10, wherein the percent contact area of the surface of the brake lining is in the range of 25–40%.

15. A method of making a brake band according to claim 10, wherein the percent contact area of the surface of the brake lining is in the range of 20–40%.

16. A brake band according to claim 10, wherein said total cross-sectional length of surface asperities is measured at a line drawn 5 μm down from the top of a tallest asperity on said surface.

* * * * *